(12) United States Patent
Terao

(10) Patent No.: US 10,581,837 B2
(45) Date of Patent: Mar. 3, 2020

(54) COMMUNICATION APPARATUS, COMMUNICATION METHOD, AND STORAGE MEDIUM

(71) Applicant: CANON KABUSHIKI KAISHA, Tokyo (JP)

(72) Inventor: Tsuyoshi Terao, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 208 days.

(21) Appl. No.: 15/688,143

(22) Filed: Aug. 28, 2017

(65) Prior Publication Data

US 2018/0069851 A1 Mar. 8, 2018

(30) Foreign Application Priority Data

Sep. 2, 2016 (JP) ................................ 2016-171653

(51) Int. Cl.
| | | |
|---|---|---|
| *H04W 4/00* | (2018.01) | |
| *H04L 29/06* | (2006.01) | |
| *G06F 16/38* | (2019.01) | |
| *G09C 5/00* | (2006.01) | |
| *H04W 76/10* | (2018.01) | |
| *H04L 9/32* | (2006.01) | |

(Continued)

(52) U.S. Cl.
CPC ........ *H04L 63/0853* (2013.01); *G06F 16/381* (2019.01); *G09C 5/00* (2013.01); *H04L 9/3239* (2013.01); *H04L 63/20* (2013.01); *H04W 12/08* (2013.01); *H04W 76/10* (2018.02); *H04W 76/11* (2018.02); *H04L 9/3271* (2013.01); *H04L 63/062* (2013.01); *H04W 12/06* (2013.01); *H04W 76/14* (2018.02)

(58) Field of Classification Search
CPC .. H04L 63/0853; H04L 63/062; H04W 12/08; H04W 76/10
USPC ............................................................. 726/4
See application file for complete search history.

(56) References Cited

U.S. PATENT DOCUMENTS 4,446,554 A * 5/1984 Webber .................. H04Q 11/06
370/260
6,137,802 A * 10/2000 Jones .................. H04Q 11/0478
370/401

(Continued)

FOREIGN PATENT DOCUMENTS

JP 2006-261938 A 9/2006

*Primary Examiner* — Eric W Shepperd
*Assistant Examiner* — Peiliang Pan
(74) *Attorney, Agent, or Firm* — Canon U.S.A., Inc. IP Division

(57) ABSTRACT

A communication apparatus determines whether the communication apparatus is connected with a wireless network, and accepts an instruction for starting setting processing of a communication parameter, which is used in performing wireless communication, with another communication apparatus that has read an image including information about a frequency channel used in the setting processing. If the communication apparatus is determined to be connected with the wireless network, the communication apparatus does not start waiting for a request for the setting processing even when the instruction is accepted. If the communication apparatus is determined not to be connected with the wireless network, the communication apparatus starts waiting for the request for the setting processing in response to acceptance of the instruction.

10 Claims, 8 Drawing Sheets

(51) Int. Cl.
*H04W 76/11* (2018.01)
*H04W 12/08* (2009.01)
H04W 76/14 (2018.01)
H04W 12/06 (2009.01)

(56) References Cited

U.S. PATENT DOCUMENTS

| | | | |
|---|---|---|---|
| 9,681,469 B2 * | 6/2017 | Hino | H04W 12/04 |
| 10,015,206 B2 * | 7/2018 | Suzuki | H04L 65/1069 |
| 2002/0194353 A1 * | 12/2002 | Haverinen | H04L 69/08 |
| | | | 709/230 |
| 2009/0029725 A1 * | 1/2009 | Gerard Kindberg | G06Q 30/02 |
| | | | 455/466 |
| 2011/0151795 A1 * | 6/2011 | D'Avello | H04K 3/226 |
| | | | 455/63.3 |
| 2014/0115674 A1 * | 4/2014 | Fukushima | H04W 12/04 |
| | | | 726/5 |
| 2014/0128095 A1 * | 5/2014 | Finlow-Bates | H04W 4/021 |
| | | | 455/456.1 |
| 2014/0219262 A1 * | 8/2014 | Sun | H04W 84/12 |
| | | | 370/338 |
| 2015/0156805 A1 * | 6/2015 | Isenmann | G08C 17/02 |
| | | | 455/426.1 |
| 2016/0066227 A1 * | 3/2016 | Townend | H04W 48/20 |
| | | | 370/331 |
| 2017/0295448 A1 * | 10/2017 | McCann | H04L 63/06 |

\* cited by examiner

COMMUNICATION APPARATUS, COMMUNICATION METHOD, AND STORAGE MEDIUM

BACKGROUND

Field

The present disclosure relates to a communication technique.

Description of the Related Art

In recent years, more and more devices, such as digital cameras, printers, mobile phones, and smartphones, have come to be equipped with wireless communication functions and used in connection with a wireless network. In particular, devices communicating with each other using a wireless local area network (LAN) as a wireless communication function are on the increase.

To connect a device to a wireless network, various communication parameters required in performing wireless communication need to be set for the device. Examples of the communication parameters include an encryption method, an encryption key, an authentication method, and an authentication key.

Japanese Patent Application Laid-Open No. 2006-261938 discusses a technique with which a device, such as a digital camera, performs setting processing of communication parameters with an access point using a function of reading a QR Code® (omitted hereinafter).

When the setting processing of the communication parameters is performed using a QR Code®, information about a frequency channel used in performing the setting processing of the communication parameters can be included in the QR code to start communication more easily. The reason is that an apparatus having read the QR code just needs to search the presented frequency channel for an apparatus having presented the QR code instead of searching all frequency channels for the apparatus. At this time, the apparatus having presented the QR code sets its operating frequency channel to the frequency channel included in the QR code and waits for a search from another apparatus.

If the apparatus having presented the QR code is already in connection with another wireless communication network, the apparatus can become disconnected from the connected wireless network when the apparatus switches the operating frequency channel to the frequency channel included in the QR code to wait for search from another apparatus.

SUMMARY

The present disclosure is directed to preventing an apparatus presenting information about a frequency channel used in setting processing of a communication parameter from being disconnected from an already-connected wireless network.

According to an aspect of the present disclosure, a communication apparatus includes a determination unit configured to determine whether the communication apparatus is connected with a wireless network, an acceptance unit configured to accept an instruction for starting setting processing of a communication parameter with another communication apparatus that has read an image including information about a frequency channel used in the setting processing, the communication parameter used in performing wireless communication, a waiting unit configured to wait for a request for the setting processing in response to acceptance of the instruction by the acceptance unit, the request transmitted from another communication apparatus, and a control unit configured to perform control so that if the determination unit determines that the communication apparatus is connected with the wireless network, the waiting unit does not start to wait for a request for the setting processing even when the instruction is received by the acceptance unit, and if the determination unit determines that the communication apparatus is not connected with the wireless network, the waiting unit starts to wait for a request for the setting processing in response to the acceptance of the instruction by the acceptance unit.

According to another aspect of the present disclosure, a communication apparatus includes a determination unit configured to determine whether the communication apparatus is connected with a wireless network, an acceptance unit configured to accept an instruction for starting setting processing of a communication parameter with another communication apparatus that has read an image including information about a frequency channel used in the setting processing, the communication parameter used in performing wireless communication, a waiting unit configured to wait for a request for the setting processing in response to acceptance of the instruction by the acceptance unit, the request transmitted from another communication apparatus, a comparison unit configured to compare a frequency channel included in the image with the frequency channel used in the wireless network that the determination unit determines that the communication apparatus is connected with, and a control unit configured to perform control so that if the determination unit determines that the communication apparatus is connected with the wireless network and a result of comparison by the comparison unit indicates that the frequency channels are different, the waiting unit does not start to wait for a request for the setting processing even when the instruction is accepted by the acceptance unit, and if the determination unit determines that the communication apparatus is connected with the wireless network and the result of comparison by the comparison unit indicates that the frequency channels are the same or if the determination unit determines that the communication unit is not connected with the wireless network, the waiting unit starts to wait in response to the acceptance of the instruction by the acceptance unit.

Further features will become apparent from the following description of exemplary embodiments with reference to the attached drawings.

DESCRIPTION OF THE EMBODIMENTS

Figure 1:
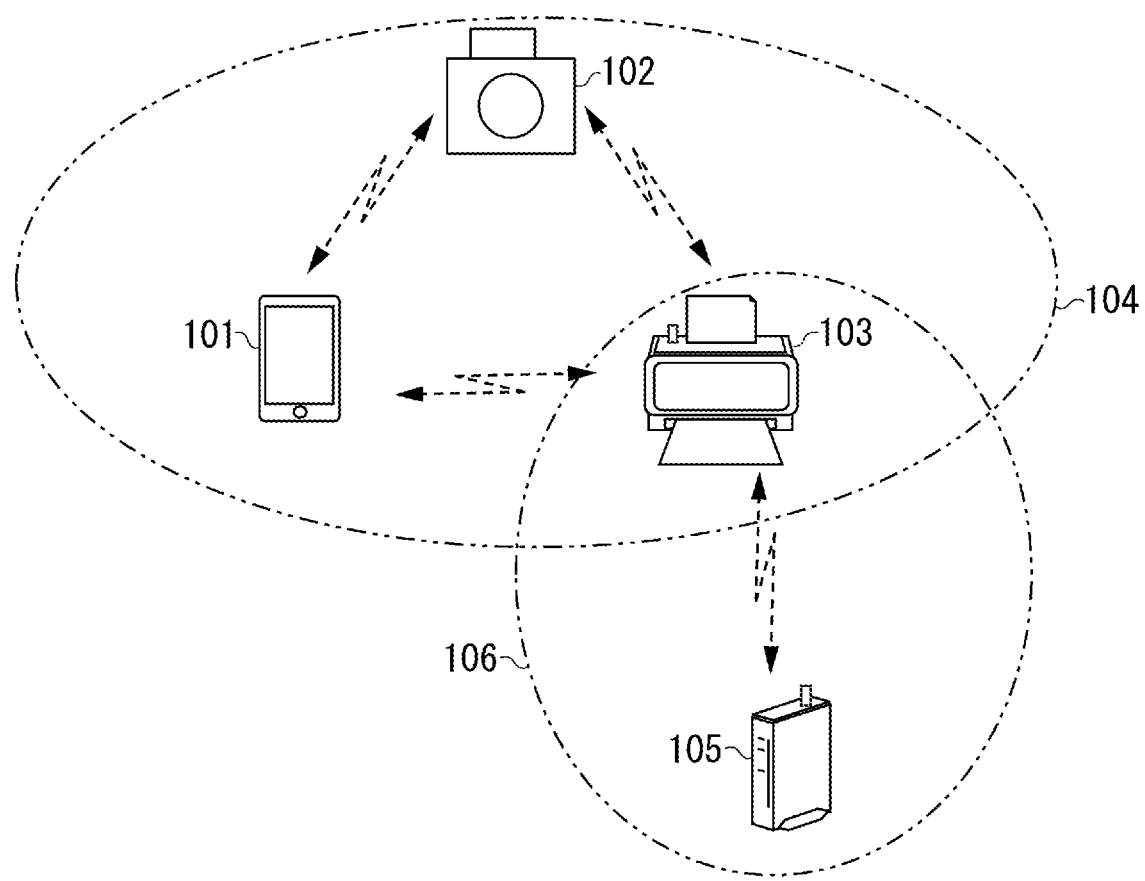
FIG. 1 is a diagram illustrating an example of a configuration of a communication system.

FIG. 1 illustrates a configuration of a communication system according to an exemplary embodiment. FIG. 1 illustrates a smartphone 101, a camera 102, a printer 103, and an access point (hereinafter, referred to as AP) 105 serving as a base station. A wireless network 106 is a first wireless network generated by the AP 105. A wireless network 104 is a second wireless network generated by the camera 102 or the printer 103. In a first exemplary embodiment, the wireless networks 104 and 106 illustrated in FIG. 1 are wireless local area networks (LANs) compliant with the Institute of Electrical and Electronics Engineers (IEEE) 802.11 standard series. The smartphone 101, the camera 102, the printer 103, and the AP 105 are communication apparatuses with a wireless LAN function.

In the present exemplary embodiment, a case in which parameter setting processing for connecting the camera 102 and the printer 103 via a wireless LAN is executed by the smartphone 101 will be described. The parameter setting processing uses Wi-Fi Device Provisioning Protocol (hereinafter, referred to as DPP) defined by the Wi-Fi Alliance®. According to DPP, an apparatus functioning as a configurator reads a QR code associated with another apparatus, and sets communication parameters to another apparatus by using a public key obtained from the read QR code. The communication parameters include various wireless communication parameters used to perform wireless communication compliant with the IEEE 802.11 standard series. For example, the communication parameters include a service set identifier (SSID) serving as a network identifier, an encryption method, an encryption key, an authentication method, and an authentication key. The communication parameters can include an Internet Protocol (IP) address for performing communication at an IP layer.

In the present exemplary embodiment, the printer 103 can operate as a wireless LAN station (hereinafter, referred to as STA) and connect to the wireless network 106 generated by the AP 105. The smartphone 101 operates as a DPP configurator to set communication parameters for constructing the wireless network 104 to the printer 103. The printer 103 constructs the wireless network 104 by using the communication parameters obtained from the smartphone 101.

The smartphone 101 then similarly performs the setting processing of the communication parameters on the camera 102. The camera 102 connects to the wireless network 104 constructed by the printer 103, by using the communication parameters obtained from the smartphone 101. Finally, the printer 103 can directly perform wireless communication with the camera 102 via the wireless network 104. Here, the printer 103 can connect to the wireless network 106 and perform communication with the AP 105 while directly performing the wireless communication with the camera 102 via the wireless network 104.

The smartphone 101, the printer 103, and the camera 102 in the communication system of the present exemplary embodiment are examples of the communication apparatuses, but can be replaced with other apparatuses, such as a video camera, various smart devices, and a personal computer (PC). The communication mode of the communication system according to the present exemplary embodiment is not limited to wireless LANs compliant with the IEEE 802.11 standard series.

Figure 2:
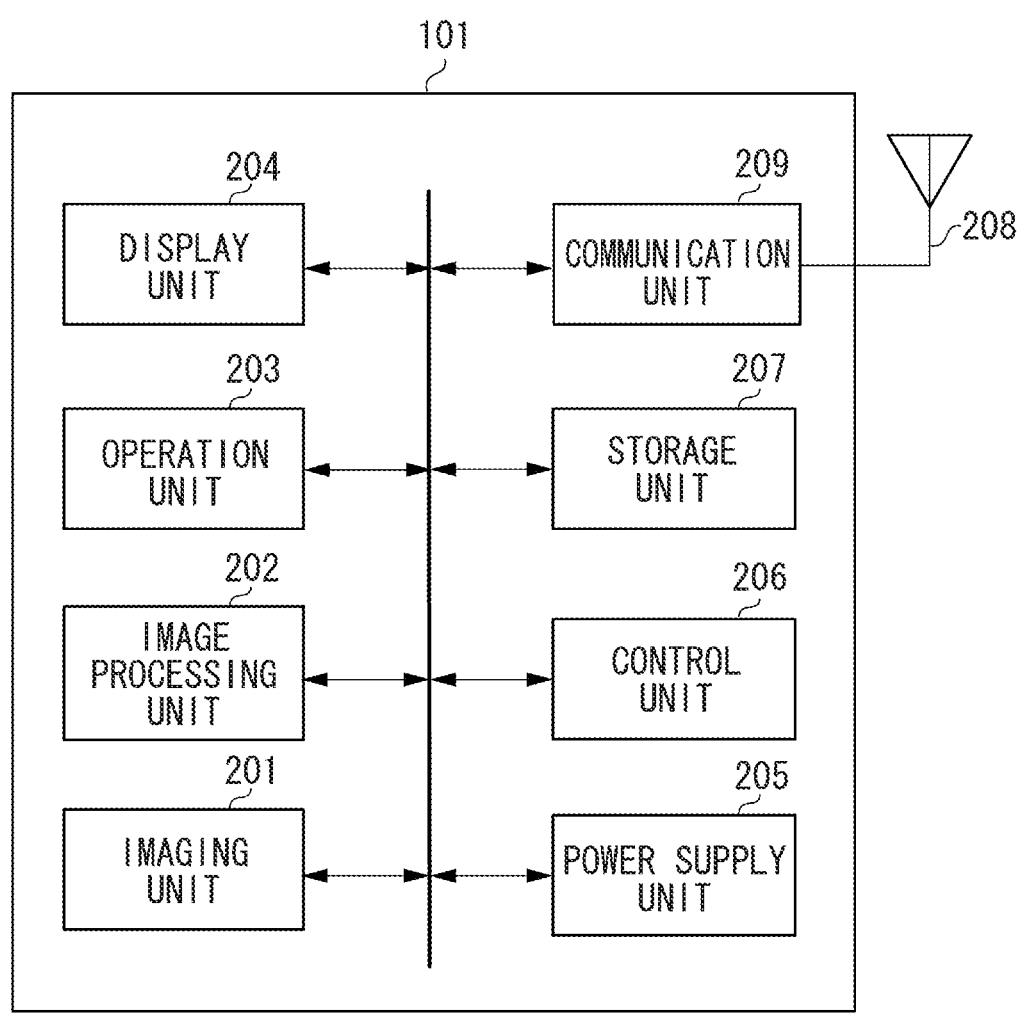
FIG. 2 is a block diagram illustrating a configuration of a smartphone.

Next, a hardware configuration of a communication apparatus according to the present exemplary embodiment will be described with reference to FIG. 2. FIG. 2 is a block diagram illustrating the hardware configuration of the smartphone 101 operating as a DPP configurator. An imaging unit 201 includes a charge-coupled device (CCD) and a lens. The imaging unit 201 captures still images and moving images. The imaging unit 201 also captures and reads images of two-dimensional codes, such as a QR code, and one-dimensional barcodes. An image processing unit 202 performs image processing on an image captured by the imaging unit 201. The image processing unit 202 performs decoding processing and analysis processing of an image such as a QR code, which is described below. The image processing unit 202 analyzes an image captured by the imaging unit 201 and decodes and obtains encoded information.

An operation unit 203 is provided for operating the smartphone 101. The operation unit 203 includes operation buttons. The operation unit 203 stores a flag corresponding to input in a memory such as a storage unit 207. A display unit 204 includes a function of outputting at least either visual information or sound information. If the display unit 204 displays visual information, the display unit 204 includes a video random access memory (VRAM) for storing image data corresponding to the visual information to be displayed. The display unit 204 performs display control to continue displaying the image data stored in the VRAM on a liquid crystal display (LCD) or a light-emitting diode (LED). A power supply unit 205 supplies power to the hardware components of the smartphone 101. For example, the power supply unit 205 includes a battery.

A control unit 206 controls the smartphone 101 by executing a control program stored in the storage unit 207. Various operations described below are performed by the control unit 206 executing the control program stored in the storage unit 207. For example, the control unit 206 includes one or more central processing units (CPUs). The storage unit 207 stores the control program to be executed by the control unit 206 and various types of information, such as information about a communication partner apparatus. For example, the storage unit 207 includes a storage medium such as a hard disk drive (HDD), a flash memory, a removable Secure Digital (SD) card, a read-only memory (ROM), and a random access memory (RAM).

An antenna 208 can communicate in a 2.4-GHz band and/or a 5-GHz band for performing wireless LAN communication. A communication unit 209 performs wireless LAN communication compliant with the IEEE 802.11 standard series. The communication unit 209 can perform protocol processing compliant with Wi-Fi Direct. The communication unit 209 includes a chip for performing wireless communication.

Functions that are stored as programs in the storage unit 207 of the smartphone 101 and implemented by the control unit 206 executing the programs will be described. The function described below is implemented by the control unit 206 controlling the hardware components and calculating and processing information according to the control program.

The smartphone 101 performs the parameter setting processing for setting communication parameters to a partner apparatus. In the parameter setting processing, a providing apparatus provides the communication parameters for performing wireless communication to a receiving apparatus. In the present exemplary embodiment, a case in which the smartphone 101 operates as the providing apparatus and the partner apparatus operates as the receiving apparatus will be described. However, this is not restrictive. If the partner apparatus already has communication parameters, the smartphone 101 can obtain the communication parameters from the partner apparatus.

The parameter setting processing according to the present exemplary embodiment will be described below. As described above, the parameter setting processing according to the present exemplary embodiment uses DPP.

The smartphone 101 captures a QR code displayed on another apparatus or associated with another apparatus, and reads the QR code. As employed herein, the QR code associated with another apparatus refers to a QR code that is generated by any method, such as printing, and not necessarily displaying. For example, a QR code can be attached to a casing of the another apparatus instead of being displayed on a display of the another apparatus. Or, a QR code can be contained in an instruction manual of the another apparatus.

The smartphone 101 obtains information required to set communication parameters, included in the read QR code. For example, the information required to set communication parameters includes information used in the parameter setting processing and an encryption key for encrypting messages exchanged in the parameter setting processing. Information that enables the smartphone 101 to search for the apparatus presenting the QR code can be included. An example of information that can be used to perform a search is information about a frequency channel of a wireless LAN. If the information about the frequency channel of the wireless LAN is included, the smartphone 101 just needs to search the frequency channel for the apparatus presenting the QR code. This can reduce search processing time.

Another example of the search-enabling information includes identification information for identifying the apparatus presenting the QR code. Examples of the identification information about the apparatus include a media access control (MAC) address and a universally unique identifier (UUID), which uniquely identify a device. If the parameter setting is performed by Wi-Fi Direct, a peer to peer (P2P) device address or a P2P interface address can be used.

To perform the parameter setting processing with the partner apparatus based on the information obtained from the QR code, the smartphone 101 transmits a search signal to the partner apparatus to search for the partner apparatus of the parameter setting processing.

In the present exemplary embodiment, the smartphone 101 performs authentication processing with the partner apparatus. The authentication processing is intended to identify whether the partner apparatus is an authorized apparatus to perform the parameter setting processing with. The authentication processing can use information included in the QR code to perform authentication between the apparatuses. A hash value of the information included in the QR code can be calculated and used as authentication information. In the present exemplary embodiment, the authentication processing includes processing for sharing an encryption key between the smartphone 101 and the partner apparatus. The encryption key is used in encrypting and transmitting the communication parameters afterward.

In the present exemplary embodiment, the search signal for performing the foregoing parameter setting processing will be described to be an authentication request signal in the authentication processing. However, this is not restrictive. For example, the signal for performing the parameter setting processing can be a search signal like a Probe Request compliant with the IEEE 802.11 standard series. Such a signal is not limited to a Probe Request, and an action frame for searching that is intended to search for a target communication apparatus can be used.

A secure wireless link can be established between the smartphone 101 and the partner apparatus, and the authentication processing and the parameter setting processing can be performed on the established wireless link. Alternatively, a predetermined frame, such as an action frame, on the wireless LAN can be used to perform the authentication processing and the parameter setting processing. In such a case, the action frame itself can be encrypted. For example, an arbitrary character string for encryption can be set between the apparatuses, and the encryption can be performed based on information about the character string.

If the smartphone 101 detects the partner apparatus and succeeds in the authentication processing, the smartphone 101 encrypts and transmits the communication parameters to the partner apparatus by wireless communication. The communication parameters can be encrypted and transmitted using a public key. The public key can be included in the QR code. An example of the public key included in the QR code is an elliptic curve Diffie-Hellman key exchange (ECDH) public key. However, this is not restrictive. Public keys of other public key encryption methods can be used.

Information about the partner apparatus to perform the parameter setting processing with can be registered in the smartphone 101. The partner apparatus to be registered can be one with which the communication parameters have been shared before. The partner apparatus to be registered can be one that is connectable via a secure link. The information about the partner apparatus to be registered can be the information obtained from the QR code. The information about the partner apparatus to be registered can be information about the wireless network previously used in performing wireless communication with the partner apparatus.

Figure 3:
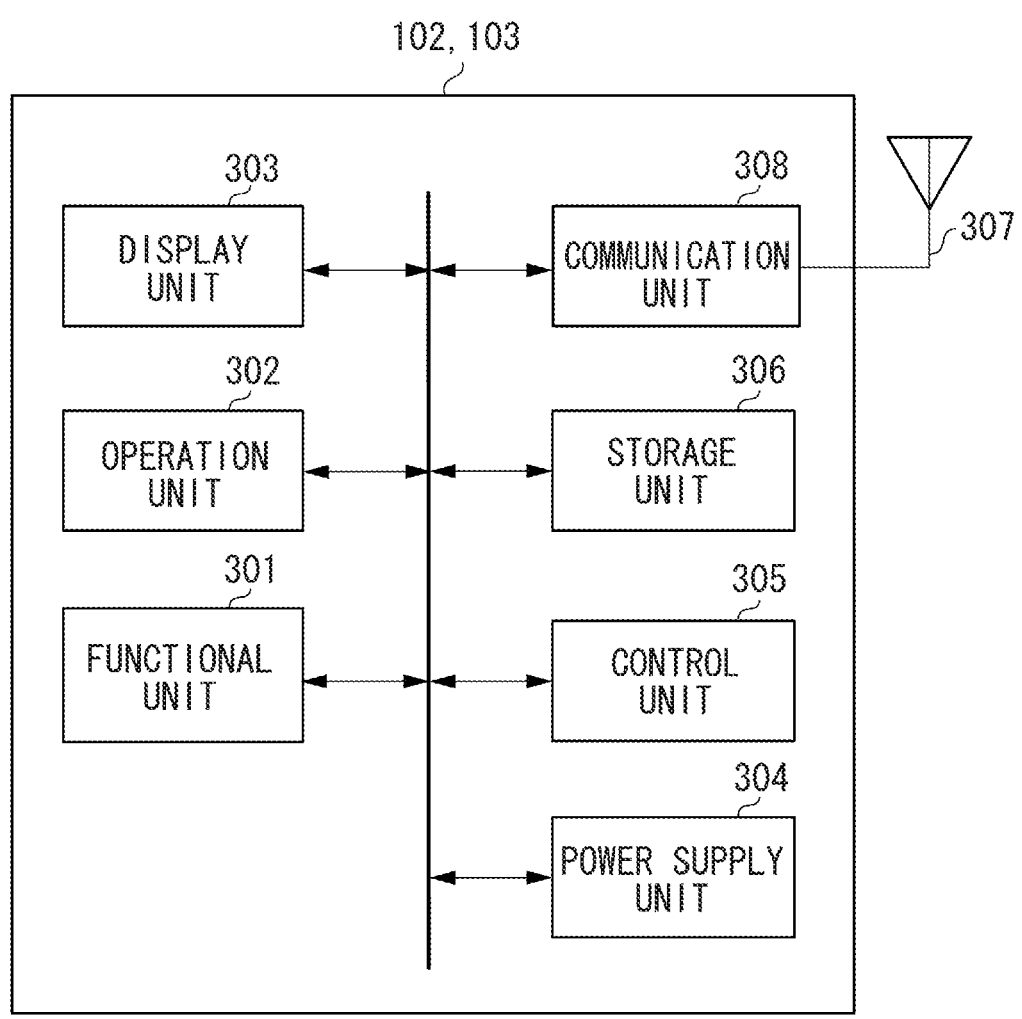
FIG. 3 is a block diagram illustrating a configuration of a camera and a printer.

Next, a hardware configuration of the camera 102 and the printer 103 according to the present exemplary embodiment will be described with reference to FIG. 3. In FIG. 3, in the case of the camera 102, a functional unit 301 is an imaging unit that performs imaging processing and image storing processing. The functional unit 301 includes hardware for performing its functions. In the case of the printer 103, the functional unit 301 is a print unit that performs print processing. An operation unit 302 is provided to operate the camera 102 or printer 103. The operation unit 302 includes operation buttons. The operation unit 302 stores a flag corresponding to input in a memory, such as a storage unit 306. A display unit 303 includes a function of outputting at least either visual information or sound information. If the display unit 303 displays visual information, the display unit 303 includes a VRAM for storing image data corresponding to the visual information to be displayed. The display unit 303 performs display control to continue displaying the image data stored in the VRAM on a LCD or LED. A power supply unit 304 supplies power to the hardware components of the camera 102 or printer 103. For example, the power supply unit 304 includes a battery or an alternating-current (AC) adapter power supply.

A control unit 305 controls the camera 102 or printer 103 by executing a control program stored in a storage unit 306. Various operations described below are performed by the control unit 305 executing the control program stored in the storage unit 306. For example, the control unit 305 includes one or more CPUs. The storage unit 306 stores the control program to be executed by the control unit 305 and various types of information, such as information about a communication partner apparatus. For example, the storage unit 306 includes a storage medium such as an HDD, a flash memory, a removable SD card, a ROM, or a RAM.

An antenna 307 can be used to perform communication in a 2.4-GHz band and/or a 5-GHz band for performing wireless LAN communication. A communication unit 308 is a communication unit for performing wireless LAN communication compliant with the IEEE 802.11 standard series. The communication unit 308 includes a chip for performing wireless communication.

Next, functions that are stored as programs in the storage unit 306 of the camera 102 or printer 103 and implemented by the control unit 305 executing the programs will be described. The following functions are implemented by the control unit 305 controlling the hardware components and calculating and processing information according to the control program.

The camera 102 and the printer 103 can perform the parameter setting processing for sharing communication parameters between the devices. The camera 102 operates as an AP and/or STA defined by IEEE 802.11 during communication of the communication unit 308. The printer 103 also functions as an AP and/or STA defined by IEEE 802.11 during communication of the communication unit 308. The AP and STA according to the present exemplary embodiment include a group owner and a client defined by the Wi-Fi Direct standard, respectively.

The communication unit 308 can establish a plurality of network connections on the same frequency channel. For example, the communication unit 308 can operate as an AP to form a wireless network while operating as an STA to join a wireless network formed on the same frequency channel by another AP. The communication unit 308 can operate as an AP or STA while waiting for various messages of the parameter setting processing on the same frequency channel.

Labels on which respective QR codes including information needed to set the communication parameters are printed are attached to the casings or accessories of the camera 102 and the printer 103. Alternatively, the QR codes can be printed on packing materials or instruction manuals of the camera 102 and the printer 103. While the information printed on the labels is not dynamically changeable, various types of information included in the QR codes printed on the labels is stored in the storage units 306 of the camera 102 and the printer 103.

An example of the information needed to set the communication parameters is information used for protocol processing of the parameter setting processing. Another example is information about the frequency channel used in performing the parameter setting processing. Since the information needed to set the communication parameters is otherwise similar to that of the foregoing smartphone 101, a description thereof will be omitted.

If the camera 102 and the printer 103 are instructed to start the parameter setting processing, the camera 102 and the printer 103 enter a waiting state for the reception of an authentication request in the parameter setting processing on the respective frequency channels included in the QR codes that are printed on the labels and associated with the camera 102 and the printer 103, respectively.

Next, an operation of the communication system with the foregoing configuration will be described. Here, a case in which the smartphone 101 is used to perform the parameter setting processing with each of the camera 102 and the printer 103 for the purpose of performing wireless LAN communication between the camera 102 and the printer 103 will be described.

Figure 4:
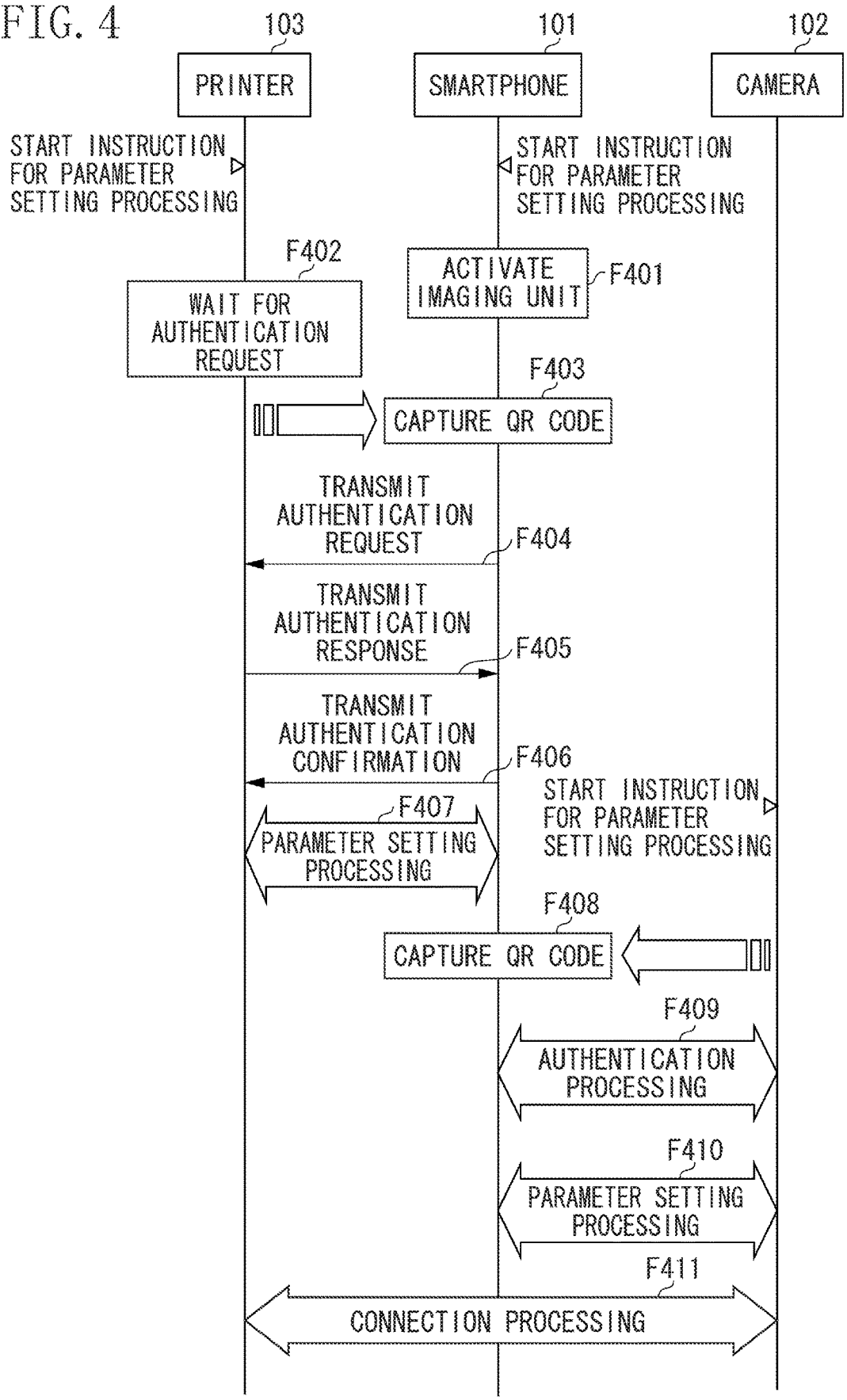
FIG. 4 is a sequence diagram illustrating an example of a first operation sequence of the communication system according to a first exemplary embodiment.

FIG. 4 is a first sequence chart of the communication system according to the present exemplary embodiment. With reference to the first sequence chart illustrated in FIG. 4, a case in which the smartphone 101 is used to establish wireless LAN connection between the camera 102 and the printer 103 will be described. The smartphone 101 initially captures the QR code of the printer 103, and performs the parameter setting processing with the printer 103. The printer 103 constructs the wireless network 104 based on the communication parameters obtained from the smartphone 101. The smartphone 101 then captures the QR code of the camera 102, and connects the camera 102 to the wireless network 104. In the first sequence chart, the printer 103 is assumed not to be connected with the wireless network 106 formed by the AP 105 before the parameter setting processing.

Initially, the smartphone 101 accepts a start instruction for the parameter setting processing. For example, the start instruction for the parameter setting processing is provided by a user operating a predetermined button on the smartphone 101. If the start instruction for the parameter setting processing is provided, then in step F401, the smartphone 101 activates the imaging unit 201 to capture a QR code. Here, the display unit 204 of the smartphone 101 can display a message such as "Display and capture the QR code on the printer". Next, the user provides a start instruction for the parameter setting processing to the printer 103.

For example, the start instruction for the parameter setting processing is provided by the user operating a predetermined button on the printer 103. If the printer 103 receives the start instruction for the parameter setting processing, then in step F402, the printer 103 starts to wait for an authentication request on the frequency channel included in the QR code according to processing of FIG. 6 described below. In step F403, the smartphone 101 captures the QR code associated with the printer. For example, a QR code attached to the casing of the printer 103.

In step F404, after capturing the QR code, the smartphone 101 transmits an authentication request to the printer 103 based on the information included in the QR code. Here, the smartphone 101 transmits the authentication request on the frequency channel intended for the parameter setting processing included in the QR code. Since the printer 103 is in the waiting state for the reception of an authentication request on the frequency channel, the printer 103 can immediately receive the transmitted authentication request.

As described above, the transmitted authentication request includes information related to the information included in the QR code. If the printer 103 receives the authentication request, the printer 103 compares the authentication request with the information included in the QR code of the printer 103 to perform authentication processing. In step F405, the printer 103 transmits the result of authentication to the smartphone 101 as an authentication response.

If the authentication response is transmitted from the printer 103 and received by the smartphone 101, the smartphone 101 analyzes the result of authentication. Based on a result of the analysis, if the authentication is found to be successful, then in step F406, the smartphone 101 transmits an authentication confirmation to the printer 103 indicating that the authentication is completed. The transmitted authentication confirmation can include information about an encryption key to be used in encrypting communication parameters.

In step F407, after the authentication processing, the smartphone 101 and the printer 103 perform the parameter setting processing, and communication parameters are transferred from the smartphone 101 to the printer 103. In the parameter setting processing, the smartphone 101 and the printer 103 perform encrypted communication with each other based on the encryption key shared by the authentication processing.

In the present exemplary embodiment, the authentication request, the authentication response, and the parameter setting processing are performed using action frames defined by IEEE 802.11. The printer 103 is in a state in which the action frames can be transmitted and received.

If the printer 103 completes setting the communication parameters, the printer 103 forms the wireless network 104 using the communication parameters transferred from the smartphone 101.

Processing similar to that of the printer 103 is then performed with the camera 102. In steps F408 and F409, the smartphone 101 captures the QR code of the camera 102, and the camera 102 and the smartphone 101 perform the authentication processing therebetween.

In step F410, after the authentication processing, the smartphone 101 and the camera 102 perform the parameter setting processing, and communication parameters are transferred from the smartphone 101 to the camera 102. In the parameter setting processing, the smartphone 101 and the camera 102 perform encrypted communication with each other based on the encryption key shared by the authentication processing. The communication parameters transferred here are those of the wireless network 104 constructed by the printer 103.

If the camera 102 completes setting the communication parameters, then in step F411, the camera 102 establishes wireless LAN connection with the wireless network 104 using the communication parameters transferred from the smartphone 101. To reduce the search time for the printer 103 by the camera 102, information enabling the printer 103 to be identified can also be transmitted when the communication parameters are transferred from the smartphone 101 to the camera 102. Examples of the information enabling the printer 103 to be identified can include the MAC address of the printer 103, frequency channel information about the wireless network 104, and the operating frequency band (information indicating whether the 2.4-GHz band or the 5-GHz band).

Information by which the camera 102 and the printer 103 can share information enabling identification of both the camera 102 and the printer 103 can be included in the transmitted communication parameters. Examples of the information enabling identification of both can include the public keys of both the camera 102 and the printer 103 included in the QR codes, information generated from the public keys, and information related to the public keys.

By the foregoing sequence, the smartphone 101 can be used to make the printer 103 construct the wireless network 104 and make the camera 102 connect to the wireless network 104 constructed by the printer 103.

Figure 5:
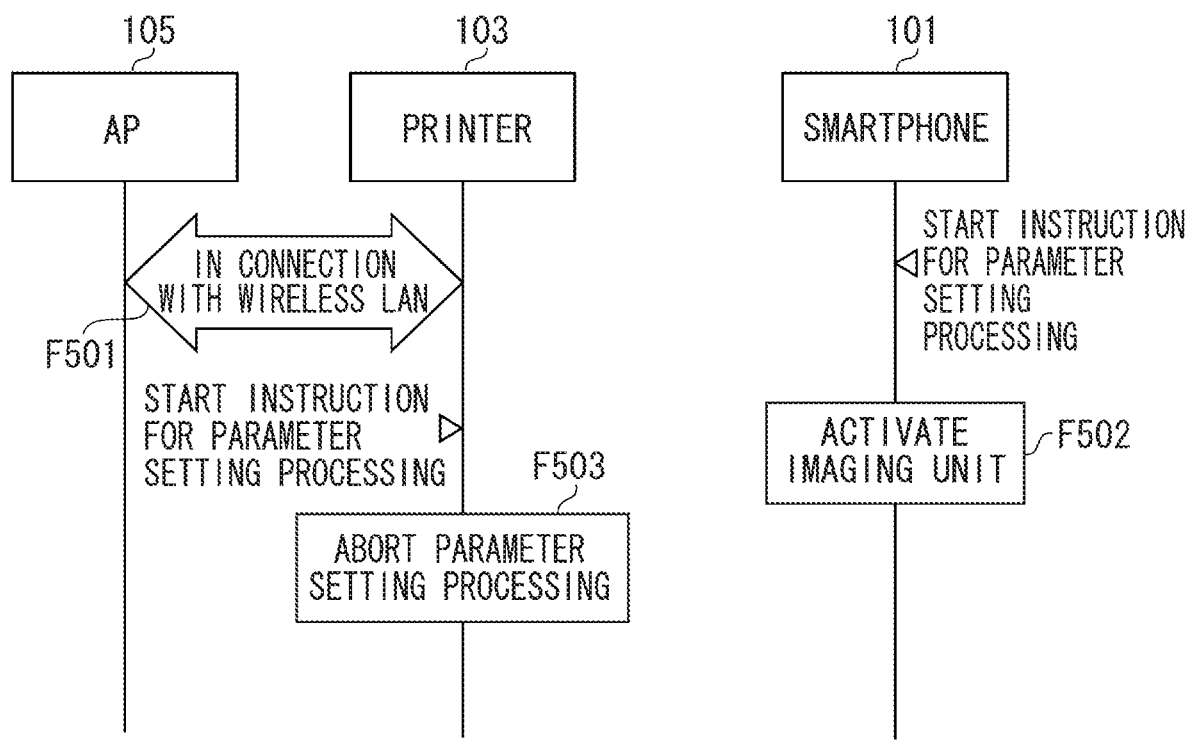
FIG. 5 is a sequence diagram illustrating an example of a second operation sequence of the communication system according to the first exemplary embodiment.

FIG. 5 is a second sequence chart of the communication system according to the present exemplary embodiment. Unlike the first sequence chart, in step F501 of the second sequence chart illustrated in FIG. 5, the printer 103 is in connection with the wireless network 106 formed by the AP 105 before a start of the parameter setting processing.

Initially, the smartphone 101 accepts a start instruction for the parameter setting processing. If a start instruction for the parameter setting processing is provided, then in step F502, the smartphone 101 activates the imaging unit 201 to capture a QR code. Here, the display unit 204 of the smartphone 101 can display a message such as "Display and capture the QR code on the printer". Then a start instruction for the parameter setting processing is provided to the printer 103. If the printer 103 receives the start instruction for the parameter setting processing, then in step F503, the printer 103 aborts the parameter setting processing according to the processing of FIG. 6, described below, since the printer 103 is already in connection with another wireless network.

By the foregoing sequence, if the instruction to start the parameter setting processing is provided and the printer 103 is already in connection with the wireless network 106, the printer 103 can be prevented from being disconnected from the connected wireless network 106 and can maintain the communication with the wireless network 106.

Figure 6:
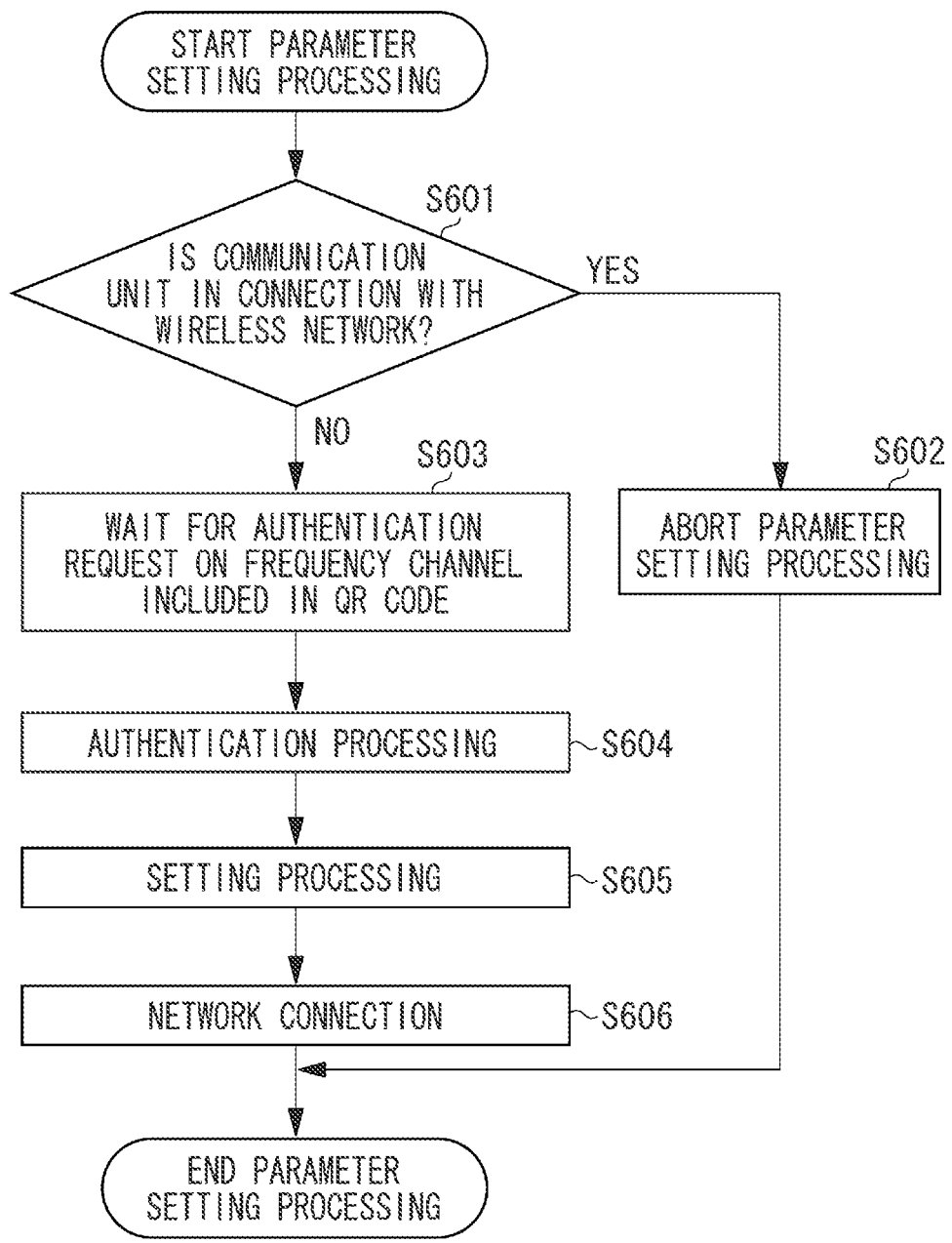
FIG. 6 is a flowchart illustrating an example of an operation of the camera and the printer according to the first exemplary embodiment.

FIG. 6 is a flowchart when the camera 102 or the printer 103, according to the present exemplary embodiment, performs the parameter setting processing. The flowchart of FIG. 6 is started when the user provides an instruction to start the parameter setting processing via the operation unit 302. In the following description, the camera 102 and the printer 103 will be referred to generically as a parameter receiving apparatus, which receives communication parameters.

The flowchart illustrated in FIG. 6 represents a flow of processing that is performed by the control unit 305 reading and executing a computer program stored in the storage unit 306. Part of or all the steps illustrated in the flowchart of FIG. 6 can be implemented by hardware, such as an application specific integrated circuit (ASIC).

The flowchart of the parameter setting processing by the parameter receiving apparatus will be described with reference to FIG. 6. In step S601, the parameter receiving apparatus receives a start instruction for the parameter setting processing, and determines whether the communication unit 308 is already in connection with another wireless network. For example, if the communication unit 308 is in connection with a network formed by another AP, the communication unit 308 is determined to be in connection with another wireless network. If the communication unit 308 is operating as an AP to form a network, the communication unit 308 is also determined to be in connection with another wireless network. The communication unit 308 can also be determined to be in connection with another wireless network if the communication unit 308 is waiting for a group owner (GO) Negotiation Request on a specific frequency channel based on the Wi-Fi Direct standard.

If the communication unit 308 is determined to be in connection with a wireless network (YES in step S601), the processing proceeds to step S602. In step S602, the parameter receiving apparatus aborts the parameter setting processing since the parameter setting processing is unable to be performed. Here, the display unit 303 can display a message such as "The parameter setting processing cannot be performed during communication" to notify the user that the parameter setting processing was aborted so that the user recognizes the reason of the error.

If the communication unit 308 is determined not to be in connection with a wireless network (NO in step S601), the processing proceeds to step S603. In step S603, the parameter receiving apparatus waits for an authentication request on the frequency channel used for the parameter setting processing, included in the QR code. An example of the authentication request is a DPP Authentication Request frame defined by the DPP standard. The authentication request includes authentication information for authentication use and identification information about the apparatus transmitting the authentication request. Examples of the authentication information for authentication use can include a hash value of the public key included in the QR code. The identification information about the apparatus transmitting the authentication request can be a public key of the apparatus transmitting the authentication request or the same public key encrypted by the public key included in the QR code. The authentication request can further include information for providing a display on the display unit 303 of the parameter receiving apparatus. For example, a model category, a model name, a nickname, and a manufacturer name of the apparatus transmitting the authentication request can be included. The parameter receiving apparatus can display on the display unit 303 part of or all the information included in the authentication request received in step S603.

In step S603, if the authentication request fails to be received within a predetermined time, the parameter receiving apparatus can end waiting for the authentication request. If the authentication request fails to be received within a predetermined time, the display unit 303 can display a message indicating an error for user notification.

In step S604, the parameter receiving apparatus performs authentication processing based on the authentication request received in step S603. For example, the parameter receiving apparatus verifies the authentication information for authentication use, included in the authentication request. If the apparatus transmitting the authentication request is determined to be the one capturing the QR code, the parameter receiving apparatus transmits an authentication response. An example of the authentication response is a DPP Authentication Response frame defined by the DPP standard. In the foregoing verification, the parameter receiving apparatus can calculate a hash value of the public key included in the QR code, compare the calculated hash value with the hash value included in the authentication request, and if the two hash values are the same, determine that the authentication is successful. A hash function used to calculate the hash value is agreed in advance between the apparatus transmitting the authentication request and the parameter receiving apparatus.

In step S604, the parameter receiving apparatus generates a shared key between the apparatus transmitting the authentication request and the parameter receiving apparatus by using information included in the received authentication request. For example, information generated by using both a secret key to be paired with the public key included in the QR code and the public key of the apparatus transmitting the authentication request, included in the authentication request, can be used as the shared key. Here, the shared key can be generated based on the ECDH method.

The authentication response transmitted by the parameter receiving apparatus includes information encrypted by the shared key generated as described above.

After the transmission of the authentication response, the parameter receiving apparatus waits until an authentication confirmation is transmitted from the apparatus transmitting the authentication request. An example of the authentication confirmation is a DPP Authentication Confirm frame defined by the DPP standard. The authentication confirmation can include authentication information encrypted using a shared key that the apparatus transmitting the authentication request generates by a method similar to that by which the parameter receiving apparatus generates the shared key. The parameter receiving apparatus can determine that the authentication is successful if the authentication information can be correctly decoded using the shared key generated by the parameter receiving apparatus.

In step S604, if the authentication fails, the parameter receiving apparatus can end the parameter setting processing. If the authentication fails, the display unit 303 can display a message indicating an error for user notification.

After the completion of the authentication in step S604, in step S605, the parameter receiving apparatus performs setting processing of communication parameters. In step S605, the parameter receiving apparatus recognizes the apparatus transmitting the authentication request to be a parameter providing apparatus, and transmits a setting request to the parameter providing apparatus. An example of the setting request is a DPP Configuration Request frame defined by the DPP standard. The setting request includes information about requested parameters. The information is encrypted by using the shared key generated in step S604. For example, a role of the parameter receiving apparatus in the formed network can be included. The role of the parameter receiving apparatus included here is one desired by the parameter receiving apparatus. After the transmission of the setting request, the parameter receiving apparatus waits until a setting response is transmitted from the parameter providing apparatus. An example of the setting response is a DPP Configuration Response frame defined by the DPP standard. The setting response transmitted by the parameter providing apparatus includes communication parameters. Specifically, for example, a network identifier, the role of the parameter receiving apparatus in the network, an encryption key for network connection, a network name, and the expiration date of the parameters are included. The role of the parameter receiving apparatus in the network can be provided as an identifier indicating either an AP or an STA. The role of the parameter receiving apparatus can also be provided as an identifier indicating either a Wi-Fi Direct group owner or client. The network name included in the setting response may be an SSID. The setting response transmitted from the parameter providing apparatus can include information indicating an operating frequency channel and a frequency band of a wireless network. The communication parameters included in the setting response can be encrypted by the shared key generated in the authentication processing.

If the setting processing is completed in step S605, then in step S606, the parameter receiving apparatus performs network connection based on the communication parameters included in the setting response received in step S605. For example, if the role of the parameter receiving apparatus included in the setting response is an AP, the parameter receiving apparatus operates the communication unit 308 as an AP to construct a network. The SSID included in the setting response can be used as the SSID of the network constructed. If the role of the parameter receiving apparatus included in the setting response is an STA, the parameter receiving apparatus operates the communication unit 308 as an STA. The parameter receiving apparatus then searches for a wireless network using the SSID included in the setting response, and connects to the wireless network found using the communication parameters included in the setting response.

As described above, according to the present exemplary embodiment, if the parameter receiving apparatus is already in connection with another wireless network when a new instruction for the parameter setting processing is provided, the parameter receiving apparatus can abort the parameter setting processing and continue communication without disconnecting the existing connection. If the parameter receiving apparatus is not in connection with a wireless network, the parameter receiving apparatus can newly perform the parameter setting processing.

In a second exemplary embodiment of the present invention, a parameter receiving apparatus performs the parameter setting processing even if the parameter receiving apparatus is in connection with a wireless network as long as the frequency channel of the wireless network is the same as that for the parameter setting processing included in the QR code. The second exemplary embodiment will be described below with a focus on differences the first exemplary embodiment.

A configuration of a communication system according to the present exemplary embodiment is the same as that in FIG. 1. A hardware configuration of the smartphone 101, the camera 102, and the printer 103 is also the same as in the first exemplary embodiment. A description thereof will thus be omitted.

Figure 7:
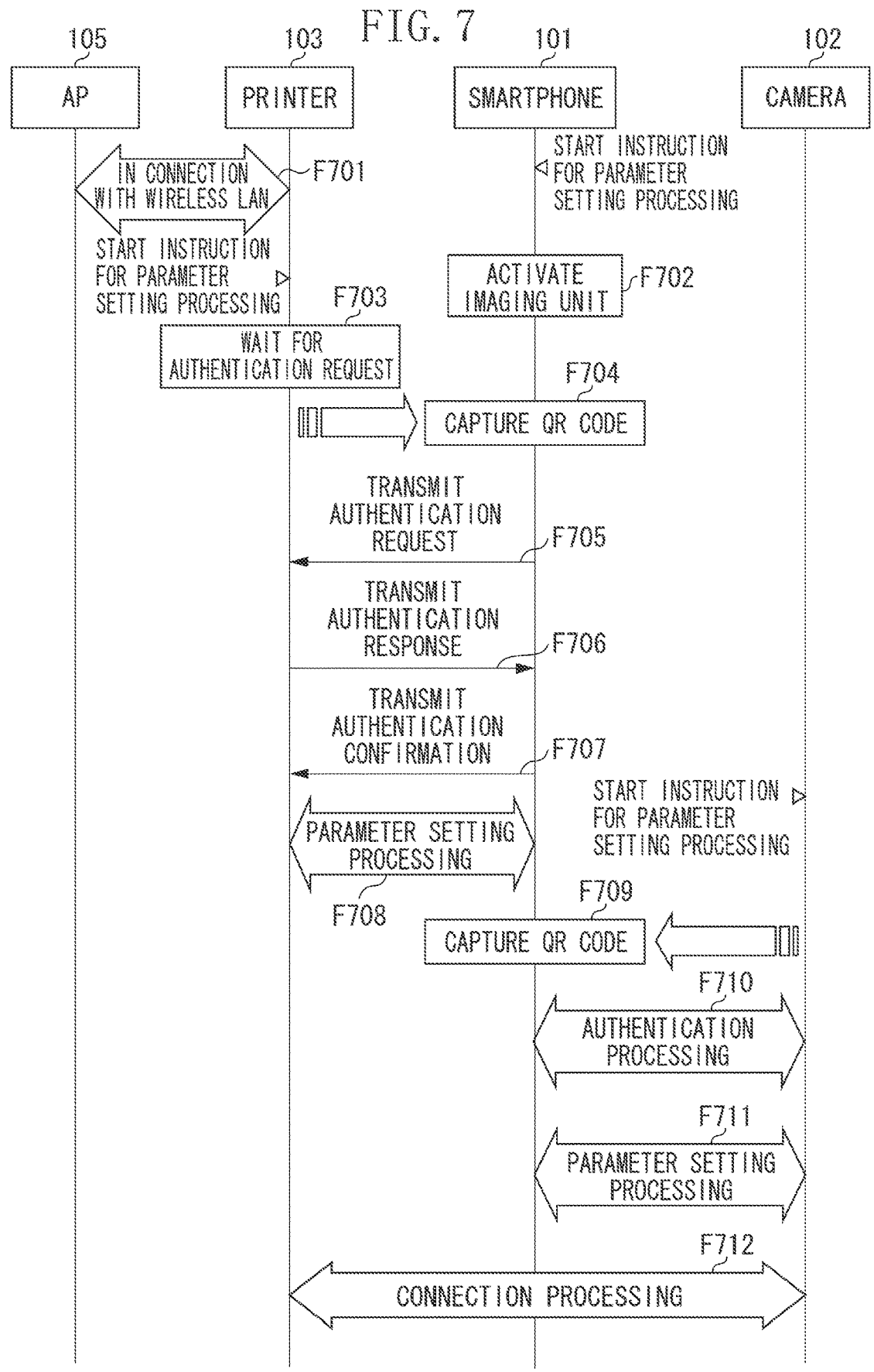
FIG. 7 is a sequence diagram illustrating an example of an operation sequence of a communication system according to a second exemplary embodiment.

A sequence chart of the communication system according to the present exemplary embodiment will be described with reference to FIG. 7. Like the second sequence chart according to the first exemplary embodiment, in step F701 of the sequence chart illustrated in FIG. 7, the printer 103 is in connection with the wireless network 106 formed by the AP 105 before a start of the parameter setting processing. The frequency channel for the parameter setting processing, included in the QR code of the printer 103, is the same as the frequency channel of the wireless network 106 formed by the AP 105.

Initially, the smartphone 101 accepts a start instruction for the parameter setting processing. If a start instruction for the parameter setting processing is provided, then in step F702, the smartphone 101 activates the imaging unit 201 to capture a QR code. Here, the display unit 204 of the smartphone 101 can display a message such as "Display and capture the QR code on the printer". Then a start instruction for the parameter setting processing is provided to the printer 103. If the printer 103 receives the start instruction for the parameter setting processing, the printer 103 makes a determination according to the processing of FIG. 7 described below. Here, the printer 103 is already communicating with the AP 105. The frequency channel of the wireless network 106 formed by the AP 105 is the same as that for the parameter setting processing included in the QR code of the printer 103. In step F703, the printer 103 then starts to wait for an authentication request used in the parameter setting processing. Here, the printer 103 starts to wait for the authentication request on the frequency channel included in the QR code. Since the frequency channel included in the QR code is the same as that used in the wireless network 106, the printer 103 can wait for the authentication request of the parameter setting processing while continuing the communication on the wireless network 106.

The processing flow of step F704 and the subsequent steps is similar to that of step F403 and the subsequent steps according to the first exemplary embodiment. A description thereof will thus be omitted.

Figure 8:
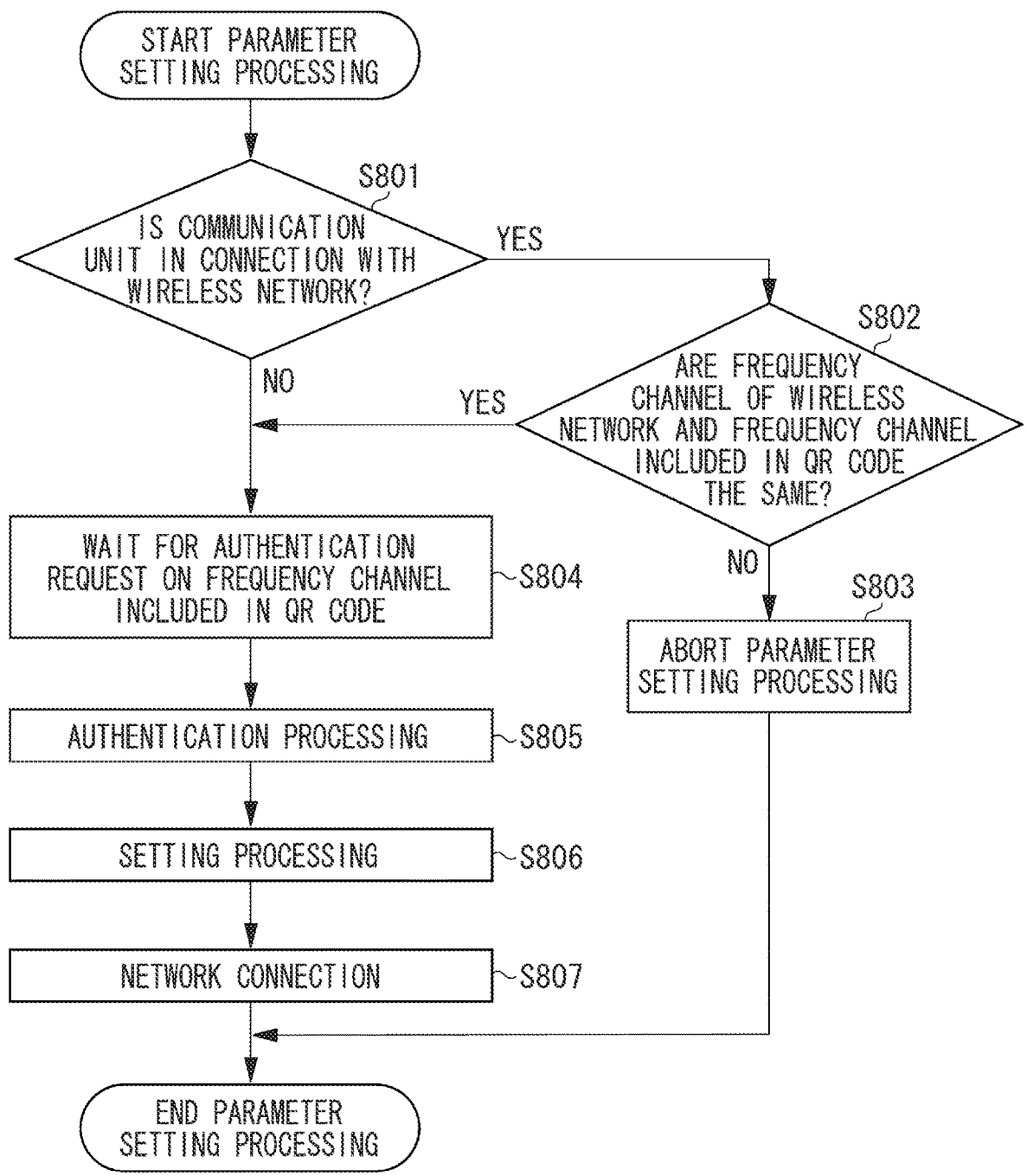
FIG. 8 is a flowchart illustrating an example of an operation of a camera and a printer according to the second exemplary embodiment.

FIG. 8 is a flowchart when the camera 102 or the printer 103, according to the present exemplary embodiment, performs the parameter setting processing. The flowchart of FIG. 8 is started if the user provides an instruction to start the parameter setting processing via the operation unit 302. In the following description, the camera 102 and the printer 103 will be referred to generically as a parameter receiving apparatus. Like FIG. 6, the flowchart illustrated in FIG. 8 is performed by the control unit 305 reading and executing a computer program stored in the storage unit 306.

In step S801, the parameter receiving apparatus receives a start instruction for the parameter setting processing, and determines whether the communication unit 308 is already in connection with another wireless network. The determination is similar to that of step S601 according to the first exemplary embodiment. A description thereof will thus be omitted.

If the communication unit 308 is determined to be in connection with a wireless network (YES in step S801), the processing proceeds to step S802. In step S802, the parameter receiving apparatus compares the frequency channel used in the connected wireless network with the frequency channel for the parameter setting processing included in the QR code. For example, if the communication unit 308 is in connection with a network formed by another AP, the frequency channel used in the connected wireless network refers to that of the network formed by another AP. If the communication unit 308 of the parameter receiving apparatus itself is operating as an AP to form a network, the frequency channel used in the connected wireless network refers to that of the wireless network formed by itself. If the parameter receiving apparatus is waiting for a GO Negotiation Request on a specific channel based on the Wi-Fi Direct standard, the frequency channel used in the connected wireless network refers to the Listen Channel.

If the result of comparison in step S802 indicates that the frequency channels are different (NO in step S802), the processing proceeds to step S803. In step S803, the parameter receiving apparatus aborts the parameter setting processing since the parameter setting processing is determined to be unable to be performed. Here, the display unit 303 can display a message such as "The parameter setting processing cannot be performed during communication" to notify the user that the parameter setting processing was aborted.

If the result of comparison in step S802 indicates that the frequency channels are the same (YES in step S802), the processing proceeds to step S804. The parameter receiving apparatus can perform the parameter setting processing without being disconnected from the connected wireless network. In step S804, the parameter receiving apparatus therefore waits for an authentication request on the frequency channel used for the parameter setting processing included in the QR code. The processing of step S804 and the subsequent steps is similar to that of step S603 and the subsequent steps in FIG. 6 according to the first exemplary embodiment. A description thereof will thus be omitted.

According to the present exemplary embodiment, if the parameter receiving apparatus is in connection with a network with a frequency channel different from that for the parameter setting processing when a new instruction for the parameter setting processing is provided, the parameter receiving apparatus can abort the parameter setting processing and continue communication without disconnecting the existing connection. If the frequency channel of the already-connected network and the frequency channel for the parameter setting processing are the same, the parameter receiving apparatus can newly perform the parameter setting processing without disconnecting the existing connection. This can improve the user's convenience.

Other Embodiments

In the foregoing first exemplary embodiment, if, in step S601, the parameter receiving apparatus is determined to be in connection with a wireless network, the parameter setting processing is aborted. In the second exemplary embodiment, if the parameter receiving apparatus is in connection with a network having a frequency channel different from that for the parameter setting processing, the parameter setting processing is aborted. However, instead of automatically aborting the parameter setting processing in such cases, the user's instructions can be used to determine whether to abort the parameter setting processing. More specifically, in such cases, a message such as "Disconnect from the connected wireless network?" can be displayed and the user's instructions about the disconnection can be accepted to determine whether to abort the parameter setting processing based on the instructions. If the user provides an instruction to disconnect from the connected wireless network, the parameter setting processing can be performed. If the user does not give the instruction to disconnect from the connected wireless network, the parameter setting processing is aborted.

In the foregoing exemplary embodiments, the QR codes to be read are not limited to those provided on casings or accessories of the apparatuses. For example, the camera 102 or the printer 103 can include a web server function display a QR code on a web page. Alternatively, one-dimensional barcodes and two-dimensional codes other than QR codes can be used instead of QR codes. Information in a user-readable format can be used instead of machine-readable information like a QR code.

In the foregoing exemplary embodiments, the communication between the apparatuses is described to be performed by wireless LAN communication compliant with IEEE 802.11. However, this is not restrictive. For example, the communication between the apparatuses can be performed using wireless communication media such as Wireless Universal Serial Bus (Wireless USB), Multi-Band OFDM Alliance (MBOA), Bluetooth®, ultra-wideband (UWB), ZigBee, and near field communication (NFC). UWB includes Wireless USB, Wireless 1394, and WiNET.

In the foregoing exemplary embodiments, the camera 102 and the printer 103 are described to be connected in a wireless LAN infrastructure mode. However, this is not restrictive. For example, an exemplary embodiment can be applied to a case in which the camera 102 and the printer 103 are connected in a wireless LAN ad hoc mode. If the camera 102 and the printer 103 have a Wi-Fi Direct connection function, an exemplary embodiment can be applied to a case in which the two apparatuses are connected by Wi-Fi Direct. In such a case, after the completion of the setting processing of the communication parameters, either the camera 102 or the printer 103 operates as a Wi-Fi Direct group owner to construct a wireless network using the shared communication parameters. The other apparatus that is not the group owner can function as a Wi-Fi Direct client and connect to the group owner for Wi-Fi Direct connection.

In the foregoing exemplary embodiments, the camera 102 and the printer 103 are configured to determine whether to start the parameter setting processing based on start instructions for the parameter setting processing. However, such instructions are not limited to those provided by the user via the operation unit 302. For example, the camera 102 and the printer 103 can be configured to regularly start the parameter setting processing at predetermined intervals, such as every minute and every hour. Alternatively, the parameter setting processing can be started based on instructions received via a different type of communication medium.

The exemplary embodiments can be carried out by processing for supplying a program for implementing one or more of the functions of the foregoing exemplary embodiments to a system or an apparatus via a network or a storage medium, and reading and executing the program by one or more processors of a computer of the system or apparatus.

The exemplary embodiments can be carried out by a circuit (for example, an ASIC) for implementing one or more of the functions.

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-171653, filed Sep. 2, 2016, which is hereby incorporated by reference herein in its entirety.

What is claimed is:

1. A communication apparatus comprising:
   one or more memories; and
   one or more processors in communication with the one or more memories that cause the communication apparatus to operate as:
   a determination unit configured to determine a frequency channel used in a connected wireless network;
   an acceptance unit configured to accept an instruction for starting setting processing of a communication parameter with another communication apparatus that has read an image including information about a frequency channel used in the setting processing, the communication parameter used in performing wireless communication;
   a waiting unit configured to wait for a request for the setting processing in response to acceptance of the instruction by the acceptance unit, the request transmitted from another communication apparatus; and
   a control unit configured to perform control so that if the frequency channel determined by the determination unit and a frequency channel included in the image are different from each other, the waiting unit does not start to wait for a request for the setting processing even when the instruction is received by the acceptance unit, and if the frequency channel determined by the determination unit and the frequency channel included in the image are same as each other, the waiting unit starts to wait for a request for the setting processing in response to the acceptance of the instruction by the acceptance unit.

2. The communication apparatus according to claim 1, further comprising a generation unit configured to generate a wireless network using the communication parameter set by the setting processing.

3. The communication apparatus according to claim 1, further comprising a connection unit configured to connect to a wireless network using the communication parameter set by the setting processing, where the wireless network being generated by an apparatus different from the communication apparatus.

4. The communication apparatus according to claim 1, wherein the wireless communication is communication by a wireless LAN compliant with the IEEE 802.11 standard series.

5. The communication apparatus according to claim 1, wherein the communication parameter includes at least any one of a network identifier, an encryption method, an encryption key, an authentication method, and an authentication key.

6. The communication apparatus according to claim 1, wherein the image is either a barcode or a two-dimensional code.

7. The communication apparatus according to claim 1, wherein the one or more processors in communication with the one or more memories further cause the communication apparatus to operate as
a comparison unit configured to compare the frequency channel included in the image with the frequency channel determined by the determination unit.

8. The communication apparatus according to claim 1, wherein if the communication apparatus is not connected with the wireless network, the control unit performs control so that the waiting unit starts to wait for a request for the setting processing in response to the acceptance of the instruction by the acceptance unit.

9. A communication method comprising:
determining a frequency channel used in a connected wireless network;
accepting an instruction for starting setting processing of a communication parameter with another communication apparatus that has read an image including information about a frequency channel used in the setting processing, the communication parameter used in performing wireless communication;
waiting for a request for the setting processing in response to acceptance of the instruction, the request transmitted from another communication apparatus; and
performing control so that if the frequency channel determined by the determining and a frequency channel included in the image are different from each other, waiting for the request is not started even when the instruction is accepted, and if the frequency channel determined by the determining and the frequency channel included in the image are the same as each other, waiting for the request is started in response to acceptance of the instruction.

10. A non-transitory computer-readable storage medium storing a program for causing a communication apparatus to execute a method, the method comprising:
determining a frequency channel used in a connected wireless network;
accepting an instruction for starting setting processing of a communication parameter with another communication apparatus that has read an image including information about a frequency channel used in the setting processing, the communication parameter used in performing wireless communication;
waiting for a request for the setting processing in response to acceptance of the instruction, the request transmitted from another communication apparatus; and
performing control so that if the frequency channel determined by the determining and a frequency channel included in the image are different from each other, waiting for the request is not started even when the instruction is accepted, and if the frequency channel determined by the determining and the frequency channel included in the image are the same as each other, waiting for the request is started in response to acceptance of the instruction.

* * * * *